(12) United States Patent
Van Der Sluis et al.

(10) Patent No.: US 6,650,465 B2
(45) Date of Patent: Nov. 18, 2003

(54) LIGHT-SWITCHING DEVICE (75) Inventors: Paul Van Der Sluis, Eindhoven (NL);
Mark Thomas Johnson, Eindhoven
(NL); Anna-Maria Janner, Eindhoven
(NL); Adrianus Sempel, Eindhoven
(NL)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 0 days.

(21) Appl. No.: 10/242,933

(22) Filed: Sep. 13, 2002

(65) Prior Publication Data

US 2003/0053188 A1 Mar. 20, 2003

(30) Foreign Application Priority Data

Sep. 18, 2001 (EP) .............................................. 01203524

(51) Int. Cl.[7] .................................................. G02F 1/29
(52) U.S. Cl. ........................ 359/320; 359/265; 359/273; 359/245
(58) Field of Search ................................ 359/238, 240, 359/242, 245, 247, 250–252, 254, 263, 267, 275, 315, 318, 320, 265, 271; 345/87, 208, 206, 76

(56) References Cited

U.S. PATENT DOCUMENTS

| 5,384,653 | A | * | 1/1995 | Benson et al. | ............... | 359/270 |
| 5,834,137 | A | * | 11/1998 | Zhang et al. | ............... | 429/193 |
| 5,905,590 | A | | 5/1999 | Van Der Sluis et al. | .... | 359/275 |
| 2001/0020922 | A1 | * | 9/2001 | Yamazaki et al. | ............ | 345/45 |
| 2002/0036816 | A1 | * | 3/2002 | Johnson et al. | ............. | 359/245 |
| 2002/0196518 | A1 | * | 12/2002 | Xu et al. | ..................... | 359/245 |

FOREIGN PATENT DOCUMENTS

WO    WO9848323    10/1998    ........... G02F/1/153

* cited by examiner

Primary Examiner—Jordan M. Schwartz
Assistant Examiner—Jessica Stultz
(74) Attorney, Agent, or Firm—Aaron Waxler (57) ABSTRACT

A matrix display (20) comprises pixels based on switching elements (30) which comprise a switchable layer which can be switched from one chemical state to another, the optical properties of said chemical states being different. Voltage-limiting devices (41, 42) preventing pixel degradation are arranged on the switching elements (30).

10 Claims, 6 Drawing Sheets

LIGHT-SWITCHING DEVICE

BACKGROUND OF THE INVENTION

1. Field of the Invention

The invention relates to a device comprising an array of pixels which are reversibly switchable between at least a first and a second chemical state, the first and second chemical states differing in optical properties, said pixels comprising a stack of layers including a switchable layer of an optically switchable material which brings about a switch from the first state to the second state of the pixel, and a driving circuit for switching the pixels.

2. Description of the Related Art

U.S. Pat. No. 5,905,590 describes a switching device comprising a switching film including hydrides of magnesium with other trivalent metals. By exchange of hydrogen, the switching film can be reversibly switched from a first, transparent, chemical state to a second, mirror-like (fully reflecting or scattering), chemical state with zero transmission via an intermediate black absorbing state. The switching film is comprised in a stack of layers, which is deposited on a transparent substrate. By virtue of the optical effect, the device can be used as an optical switching element, for example, as a variable beam splitter, optical shutter, and for controlling the illuminance or the shape of light beams in luminaires. The switching device can also be used for data storage and in optical computing, and in applications such as architectural glass, vision control glass, sunroofs and rearview mirrors. By making a pattern in the switching film and providing the patterned switching film with transparent electrodes, a thin display can be manufactured having an array of pixels. A thin display device conventionally comprises an array of pixels and a driving circuit for switching the pixels.

It is a problem with this type of device that throughout the device, the switching behavior of the pixels should be the same, while also a long-term stability of the pixels is required. Any difference in these properties would be or become visible to the viewer either in intensity or image differences on the display or in an ongoing degradation of the image.

SUMMARY OF THE INVENTION

It is an object of the invention to provide a switching device having a long-term stability and a good image reproduction. To this end, the invention provides a device which is characterized in that the device comprises pixels for which a voltage-limiting device is arranged parallel to the stack of layers.

Pixels are switched by supplying a switching current to the stack of layers by means of applying a voltage across the stack of layers. Application of said voltage results in a change of the chemical state of the switchable material, e.g. in the switching mirror device H-ions migrate from one H-containing layer to the other whilst an electric current flows around the device. The optical properties depend on the state of charge of this hydrogen battery or, in other words, on the chemical state of the switchable layer. Another example of switchable layers is embodied in electrochromic devices, such as disclosed, for instance, in World Patent application no. WO 98/48323 in which a stack of layers is present comprising a switchable electrochromic layer comprising a metal oxide such as tungsten oxide, molybdenum oxide, niobium oxide, manganese oxide or zirconium oxide or mixtures thereof. Applied voltages in the driving circuit will vary over the display due to current losses. Ideally, the pixels are switched fast. If a voltage which is sufficient for a particular pixel in the center of the display to switch is applied across said stack, i.e. a voltage slightly above the threshold voltage for switching a stack, other pixels closer to a primary voltage source will, due to electrical losses in the driving circuit, usually receive a much higher voltage, well above said switching threshold voltage. As the inventors have realized, applying a too high voltage across a pixel will lead to a degradation of the stack and to a loss of picture quality. The threshold voltages of the stacks are relatively close to voltage levels which will degrade the stack. If, on the other hand, the switching voltage for a pixel at the edge of the display has the right magnitude, i.e. enough to switch the stack, but not enough to degrade the stack, the switching voltages for pixels in the center of the display are considerably lower, having as a consequence that either the switches are too slow, or the stack is not switched at all. Both effects lead to errors in the image.

By introducing, according to the invention, for at least some pixels a voltage-limiting device on the stack of layers, such as preferably a diode, the voltage across the stack is limited, so that application of a too high voltage across the stack is prevented, thereby preventing degradation. This allows the use of switching voltages in the display which are anywhere in the display over the threshold for switching of the stack and over the voltages which would lead to a degradation of the stack. The voltage-limiting devices ensure that the effective voltage across the stack is kept below a voltage which would lead to degradation of the stack. Preferably, all pixels are provided with a voltage-limiting device to prevent degradation of every pixel.

It is remarked that the invention relates to devices in which, by application of a voltage, a change is produced in the chemical state of the switchable layer. Such a chemical state change is in essence a redox reaction whereby, to and for, the switchable layer transport of ions (Hydrogen, Oxygen, Lithium or others) or electrons occurs. Such devices differ within the framework of the invention fundamentally from devices in which the application of a voltage leads to a transition between two states of a material which do not differ in chemical property, but only in physical properties (for instance, birefringence), such as e.g. LCD devices. Applying a voltage in an LCD device well over the switching voltage does not normally lead (unless truly excessive voltages are applied, usually far outside the range of driving circuits) to permanent damage to the LCD layer.

A diode is preferred for use as a voltage-limiting element, since it is a simple element, which can easily be implemented. Also with present technologies, diodes are available which operate at a suitable voltage. Within the framework of the invention, a 'diode' is any element functioning as a diode, including e.g. a diode-connected transistor.

The invention is of particular advantage when use is made of an active matrix display using TFTs.

The voltage needed for switching a "transparent" device is typically about 1–2 volt, and for a symmetric device it may be as low as about 300 mV.

Since the voltages needed for switching a pixel may be well below 1 V, the TFTs will have to be run with a low drain-source voltage (say, 0.3V–2 V, the maximum voltage before the pixels begin degrading) but with a high gate voltage (say, 10 V). This means that the TFTs are not operating in the current saturation range, but in the linear range, where the current can vary strongly. The current may also be lower than ideally required, which will slow down the switching. However, to obtain the desired pixel current levels (typically 50 µA), a TFT typically requires a drain-source voltage of around 2–3V. The use of the voltage-limiting device on the stack in the present invention prevents the pixel voltage from increasing to this value during and/or at the end of the charging cycle, which would otherwise happen, and thereby prevents the display device from degrading strongly or being destroyed while yet enabling an active matrix TFT circuit to be used, which is very advantageous for this type of display device.

Preferably, two current-limiting devices are arranged in parallel on the stack to limit the voltage across the stack during charging and discharging.

In a preferred embodiment of the invention, one side of the voltage-limiting devices is connected to a reference voltage point or line in the driving circuit. This reduces the number of connections to the stacks and makes it possible to adjust the reference voltages and thereby adjust the limiting voltage across the stack by adjusting the reference voltage.

BRIEF DESCRIPTION OF THE DRAWINGS

These and other aspects of the invention will now be described with reference to the drawings. In the drawings, FIG. 2 shows part of a matrix of pixel elements of a switching mirror device according to the invention, while

The Figures are schematical and not drawn to scale. In general, like reference numerals identify like elements.

DESCRIPTION OF THE PREFERRED EMBODIMENTS

The protective scope of the invention is not limited to the embodiments described below, which relate to a switching mirror device having a switchable material based on hydrides. For example, it may be applied to electrochromic devices in which the optically switching layer brings about a change of concentration of hydrogen, lithium or oxygen ions, in which devices the switching threshold voltage for switching the devices and the degradation threshold voltage are also relatively close to each other. Electrochromic devices form a class of materials in which, by a reversible reduction/oxidation or another electrochemical reaction, there is a change of the chemical and/or electronic state of the switchable layer. The switching mirror devices form a class in which the chemical composition of the switchable layer changes from one form of hydride to another.

Figure 1A:
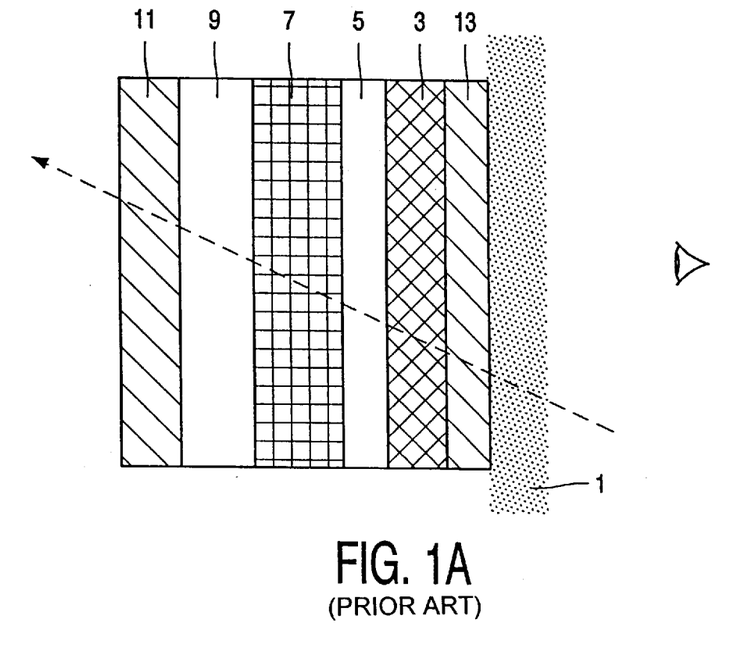
FIGS. 1A, 1B are cross-sections of a stack of layers of a switching mirror display according to the prior art.
Figure 1B:
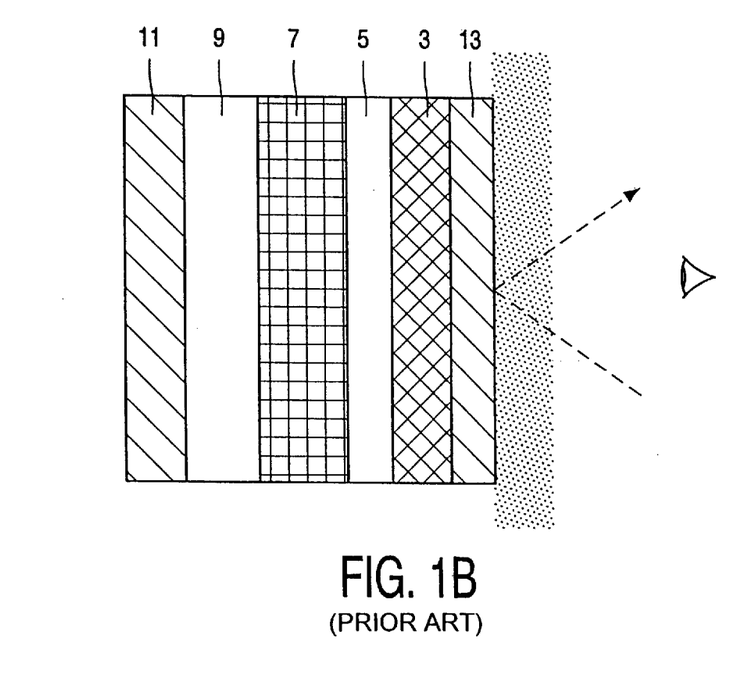

FIGS. 1A, 1B are cross-sections of a switching mirror device. The device could be, for instance, a display device or a document reader or a fingerprint reader. The device comprises a transparent glass plate 1 on which a stack of layers is deposited by means of conventional methods, such as vacuum evaporation, sputtering, laser ablation, chemical vapor deposition or electroplating. The stack comprises a switching film layer 3 of $LMgH_x$ (L being an element of the Lanthanide series of the Periodic System of Elements, Sc, Y or Ni,). The switching film layer has typically a thickness of about 200 nm. The stack further comprises a palladium layer 5 with a thickness of about 5 nm, a layer 7 of an ion-conducting electrolyte with a thickness in the range of 0.1 to 10 nm and a hydrogen storage layer 9.

$GdMgH_x$ is a very suitable switching material, as far as optical properties and switching time are concerned, but other magnesium-lanthanide alloys might be employed as well. The switching film 3 may be reversibly switched between a low-hydrogen composition and a high-hydrogen composition. At intermediate H compositions, the film is absorbing in various degrees. The various compositions have different optical properties. At a low-hydrogen content, the film has a metallic character, and is non-transparent. The film then reflects like a mirror. At a high hydrogen content, the film 3 is semiconductive and transparent, whereas at intermediate hydrogen concentration, the switching film is absorbing. L may also be Pd, Pt, Ir or Rh for which it is remarked that the inventors have found that $PdMgH_x$, $PdMgH_x$, $PdMgH_x$, $RhMgH_x$ have superior contrast ratios. Said property, i.e. the superior contrast ratio, is usable and useful for any switchable layer in a switching device independent of the use of a diode as described here or the particular choice of a driving circuit.

The palladium layer 5 serves to increase the rate of hydriding or dehydriding, and thus the switching speed. Other electro-catalytic metals or alloys, such as platinum or nickel might also be used. In addition, this metal layer protects the underlying switching film 3 against corrosion by the electrolyte. The palladium layer 5 may have a thickness in the range between 2 and 100 nm. Thin layers of 2 to 10 nm are preferred, however, because the thickness of the film determines the maximum transmission of the switching device.

For a proper functioning, also a H-storage layer 9 and a H-ion conducting electrolyte layer 7 are required. A good H-ion conducting electrolyte is $ZrO_{2+x}H_y$. The electrolyte must be a good ion conductor, but it must be an isolator for electrons in order to prevent self-discharge of the device. Use is most preferably made of transparent solid-state electrolytes, because of the simplicity of the device; they prevent sealing problems, and the device is easier to handle.

If the transparent state of the switching mirror is required, a good candidate for the storage layer is $WO_3$. If the transparent state of the switching mirror is not required, a second $GdH_2Mg$ layer can be used as storage layer. This will result in a symmetric device, which has the advantage that the device can be thinner. A symmetric device may be used for an application where only switching between the reflective and the absorbing state is necessary (e.g., a document reader)

The stack is sandwiched between two transparent electroconductive electrode layers 11, 13 of, for example, indium-tin oxide (ITO). Electrode layers 11, 13 are connected to a(n) (external) current source (not shown). By applying a DC current, the low-hydrogen, mirror-like composition is converted to the high-hydrogen composition, which is transparent and neutral gray. The device now acts as a transparent window, as is shown in FIG. 1A by the dashed line. When reversing the current, the switching film 3 returns to the low-hydrogen state, which is mirror-like and non-transparent, as is shown in FIG. 1B. The switching time is comparable to that of conventional electrochromic devices. The device can operate at room temperature. Once the mirror has reached the desired optical state, virtually no current will flow through the device. This means that the display will hold information with a very low power.

Figure 2:
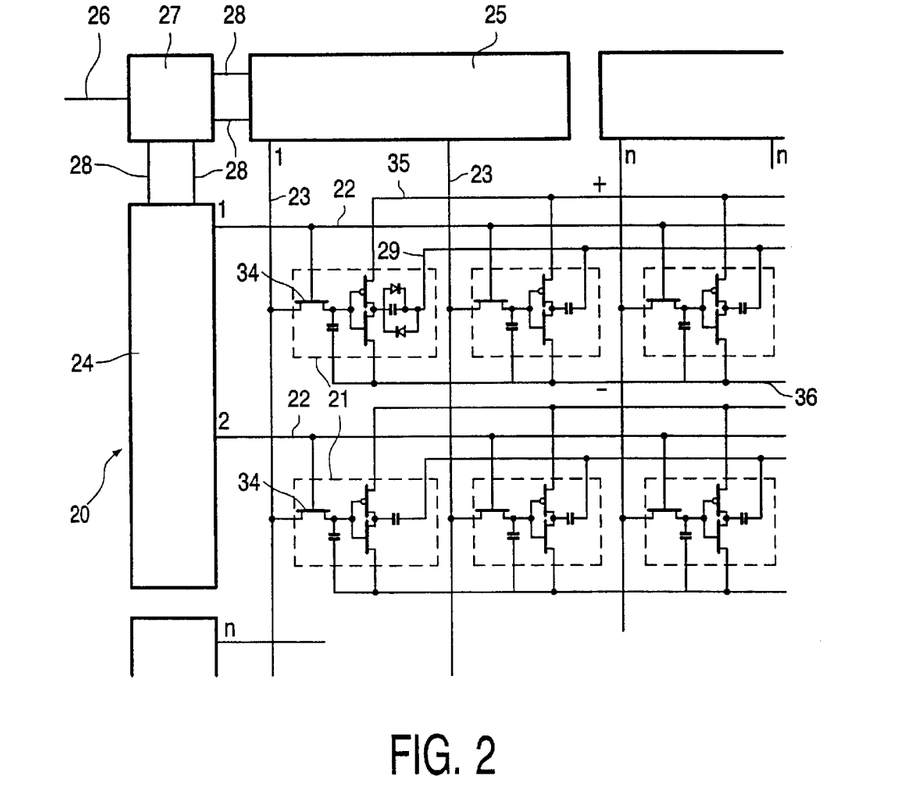

FIG. 2 shows a part of a display device 20 comprising a matrix of display circuit elements 21 at the areas of crossings of m row electrodes 22 (selection electrodes) and n column electrodes 23 (data electrodes). Row electrodes 22 are selected by means of a row driver 24, while column electrodes 23 are provided with data voltages via a column driver 25. Incoming data signals 26 are, if necessary, processed in a processor 27. Mutual synchronization occurs via control lines 28.

One embodiment of a display circuit element 21 according to the invention will now be described with reference to FIG. 3. It comprises a switching mirror device 30 as described with reference to FIGS. 1A, 1B, which for simplicity is represented by a capacitor 30. One transparent electroconductive electrode layer, 11 in this example, is connected to a fixed reference voltage (0V in this example) supplied by a voltage line 29. The other transparent electroconductive electrode layer 13 is connected to the common point of a series connection of complementary switches, in this example an n-type field effect transistor (TFT) 31 and a p-type field effect transistor (TFT) 32 between a positive voltage line 35 and a negative voltage line 36. Gate connections of n-type TFT 31 and p-type TFT 32 are interconnected and at the same time connected to one plate of a capacitor 33, which functions as a storage capacitor and is addressed by TFT 34 via m row electrodes 22 (selection electrodes) and n column electrodes 23 (data electrodes). The other plate is connected to the negative voltage line 36. A diode 41 is arranged on the switching mirror devices, such that the maximum voltage across the stack during charging is kept below a threshold voltage and a diode 42 is arranged such that the maximum voltage across the stack during discharging is kept below a threshold voltage.

During selection of a row via electrodes 22, the data voltage, as supplied by data electrode 23 is transferred to the gates of the n-type TFT 31 and p-type TFT 32 (node 37). Either one of the field effect transistors (dependent on the sign of the data voltage) starts conducting and acts as a current source and, dependent on the sign of the data voltage, starts charging (arrow 38) or discharging (arrow 39) the switching mirror element 30. During the hold time, the remainder of rows in the display is selected. The storage capacitor 33 (which may be formed by the inherent gate-drain capacitance of TFT 31) ensures that, during this hold time, the current sources continue to deliver current needed for switching the switching mirror elements 30. This may be effected during one frame period (the time all lines are selected once), but may also last several frame times (depending on the size of the display, the dimensions of the mirrors and the TFTs). After completion of the charging (e.g. to be determined by means of a current detector) the current is switched off and the switching mirror element 30 will remain in the state it reached.

The voltage needed for switching a "transparent" device is typically about 1–2 volt, and for a symmetric device it can be as low as about 300 mV.

The voltage-limiting devices 41 and 42 on the stack of layers limit the voltage across the stack, so that application of a too high voltage across the stack is prevented, thereby preventing degradation. This allows the use of switching voltages in the display which are anywhere in the display over the threshold for switching of the stack and over the voltages which would lead to a degradation of the stack. The voltage-limiting devices ensure that the effective voltage across the stack is kept below a voltage which would lead to degradation of the stack.

Since the voltages needed for switching a pixel can be well below 1 V, TFTs would have to be run with a low drain-source voltage (say 0.3V–2 V, the maximum voltage before the pixels begin degrading) but with a high gate voltage (say 10 V). This means that the TFTs are not operating in the current saturation range, but in the linear range, where the current can vary strongly. The current may also be lower than ideally required, which will slow down the switching. However, to obtain the desired pixel current levels (typically 50 $\mu A$), a TFT typically requires a drain-source voltage of around 2–3V or higher. The use of the voltage-limiting devices 41 and 42 on the stack in the present invention prevents the pixel voltage from increasing to this value during or at the end of the charging cycle or discharging, which would otherwise happen.

Apart from this, the n-type and p-type transistors may be addressed by two separate select lines (while adding a further storage capacitor) and could then both be of the same polarity.

Figure 3:
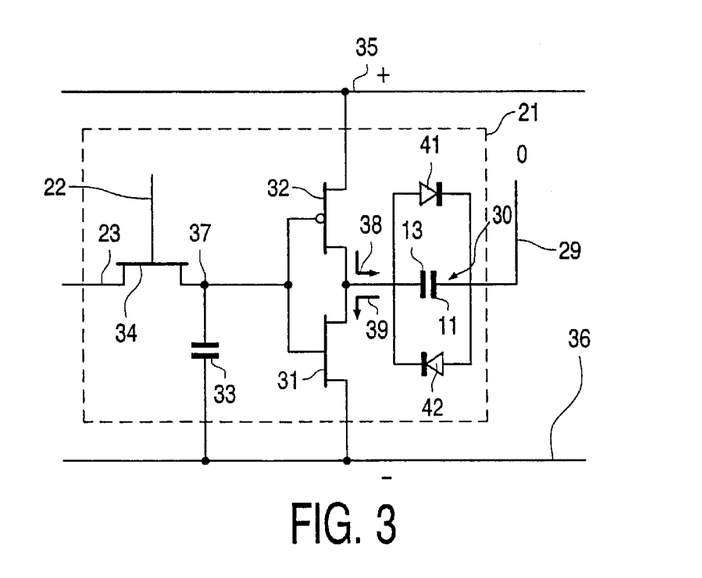
FIGS. 3 and 4 show schematically various embodiments of the device according to the invention.
Figure 4:
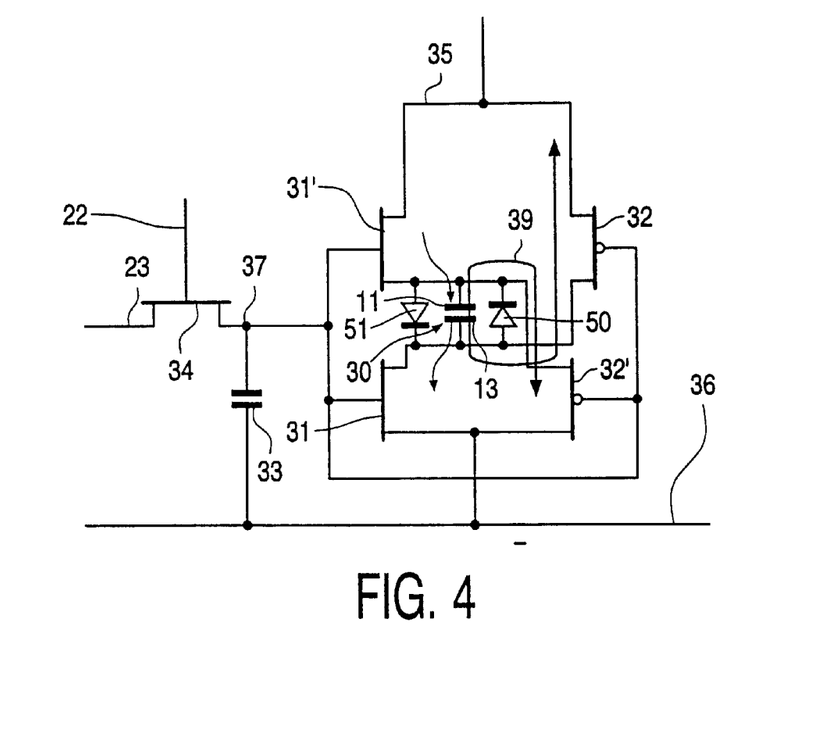

FIG. 4 shows an embodiment in which the voltage line 29 of FIG. 3 is dispensed with at the expense of an extra n-type field effect transistor (TFT) 31' and an extra p-type field effect transistor (TFT) 32'. The second series connection of two complementary switches (TFT's 31', 32') is arranged in reverse sense with respect to the first series connection of two complementary switches (TFT's 31,32) between the two voltage lines 35,36. The transparent electroconductive electrode layer 11 is now connected to the common point of the series connection of TFT's 31', 32'. Dependent on the data voltage transferred to node 37, either TFTs 31, 31' start conducting and charging (arrow 38) the switching mirror element 30 or TFTs 32, 32' start conducting and discharging (arrow 39) the switching mirror element 30. Two diodes are arranged 50 and 51 to limit the maximum voltage across element 30. The other reference numerals in FIG. 4 have the same significance as those in FIG. 3.

Figure 5:
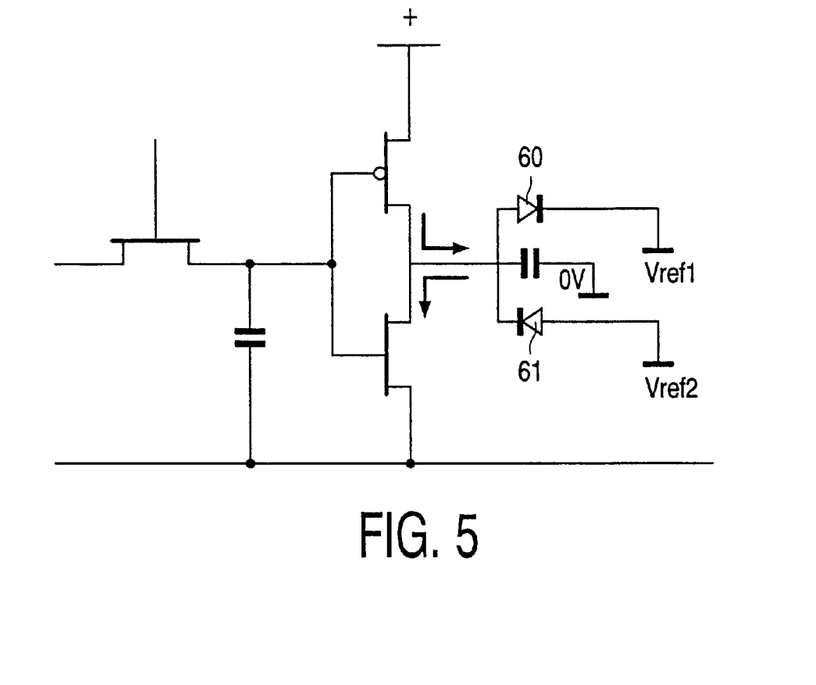
FIG. 5 shows an example of the invention in which the diodes are connected to reference voltage lines on the active matrix substrate.

One of the limitations of the embodiments shown in FIGS. 3 and 4 is that only switching mirror devices which degrade at the voltages available in the diodes (0.6–0.8V) can be protected properly. A second weakness is that the diodes as drawn need to be contacted to the top electrode of the switching mirror, which will require that a contact via is made in every pixel. These two problems are avoided in the preferred embodiment shown in FIG. 5. In FIG. 5, this is illustrated on the basis of one of the standard driving methods (shown in FIG. 3)—it is, however, equally applicable to the device illustrated in FIG. 4.

In FIG. 5, the diodes 60, 61 are no longer connected to the top electrode of the switching mirror device, but to reference voltage lines on the active matrix substrate (intact for each voltage, Vref1 and Vref2, a single additional connection for the entire display). This makes the via connection to the top electrode in every pixel superfluous.

Furthermore, by adjusting the reference voltage (Vref) relative to the top contact voltage (0V in FIG. 5), we can tune the maximum voltage across the switching mirror. As an example, if we use a diode with 0.7V built in voltage, when Vref1 is set to 0.3V, then the maximum voltage will be set to 1.0V, whilst a Vref1 of −0.4V will lead to a protection voltage of 0.3V. In a similar manner, setting Vref1 to −0.3V, then the maximum voltage will be set to −1.0V, whilst a Vref1 of 0.4V will lead to a protection voltage of −0.3V. In this way, all switching mirrors can be protected by this preferred embodiment. It is even possible to protect asymmetric switching mirror devices by defining Vref1 and Vref2 differently for the charge and discharge cycles.

Figure 6:
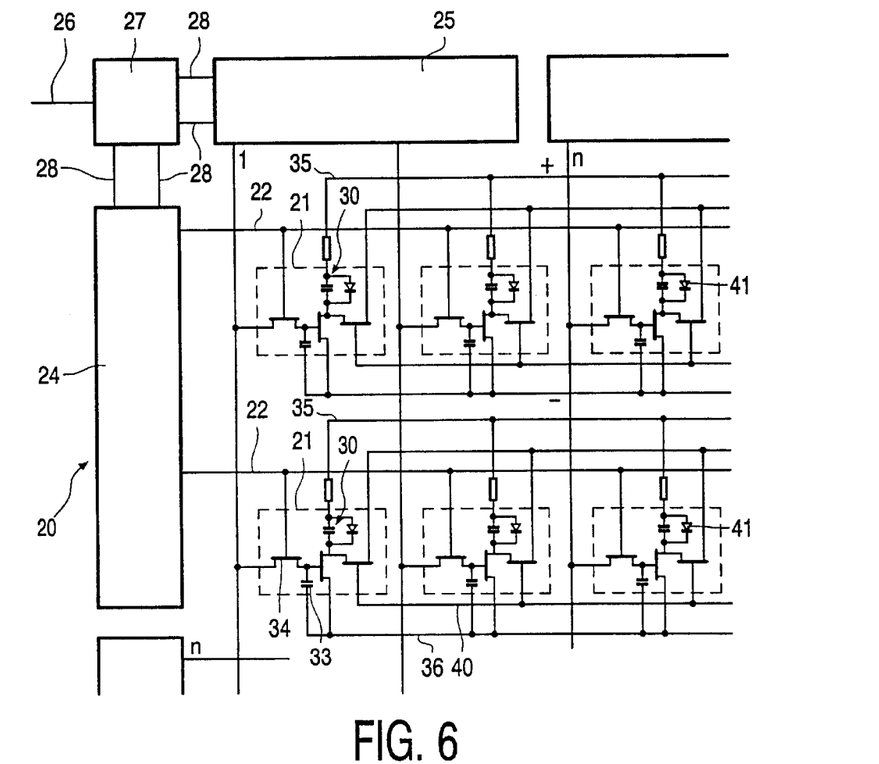
FIGS. 6 to 8 show yet another embodiment of a device in accordance with the invention.
Figure 7:
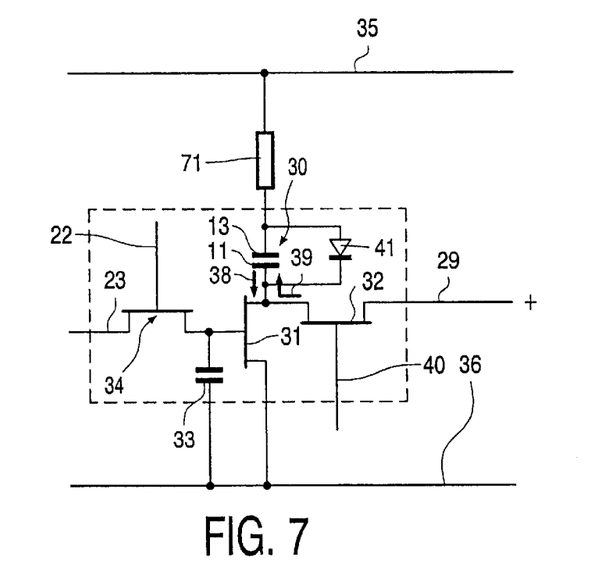
Figure 8:
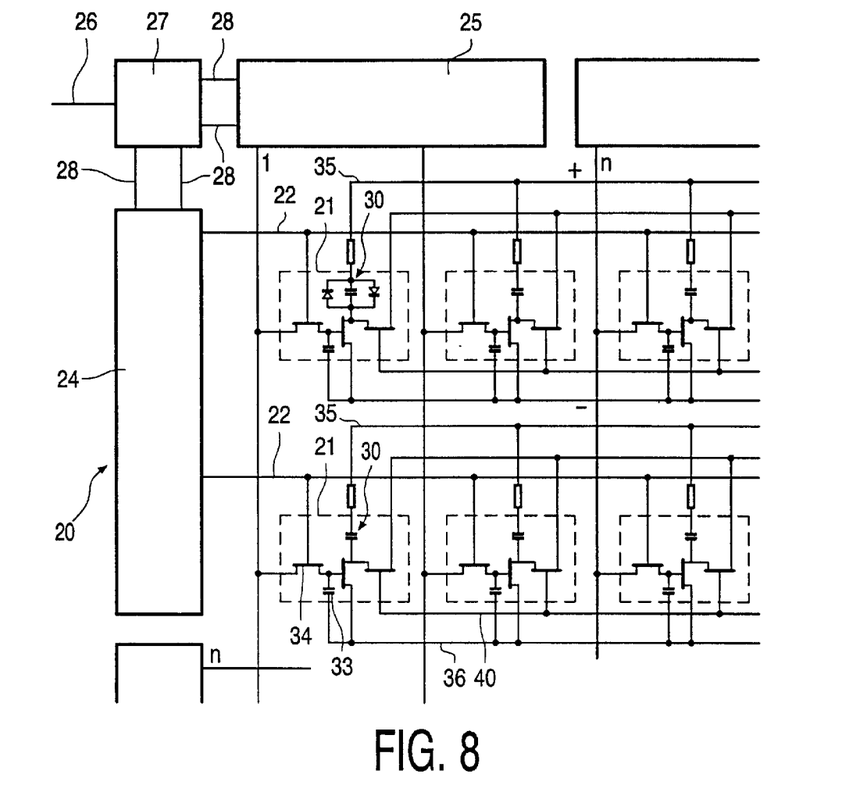
Figure 9:
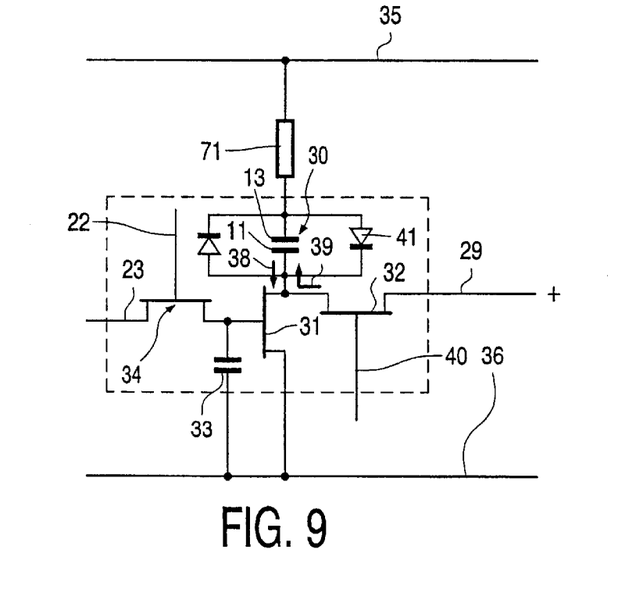
FIGS. 9 and 10 show yet other illustrative embodiments of a device in accordance with the invention.
Figure 10:
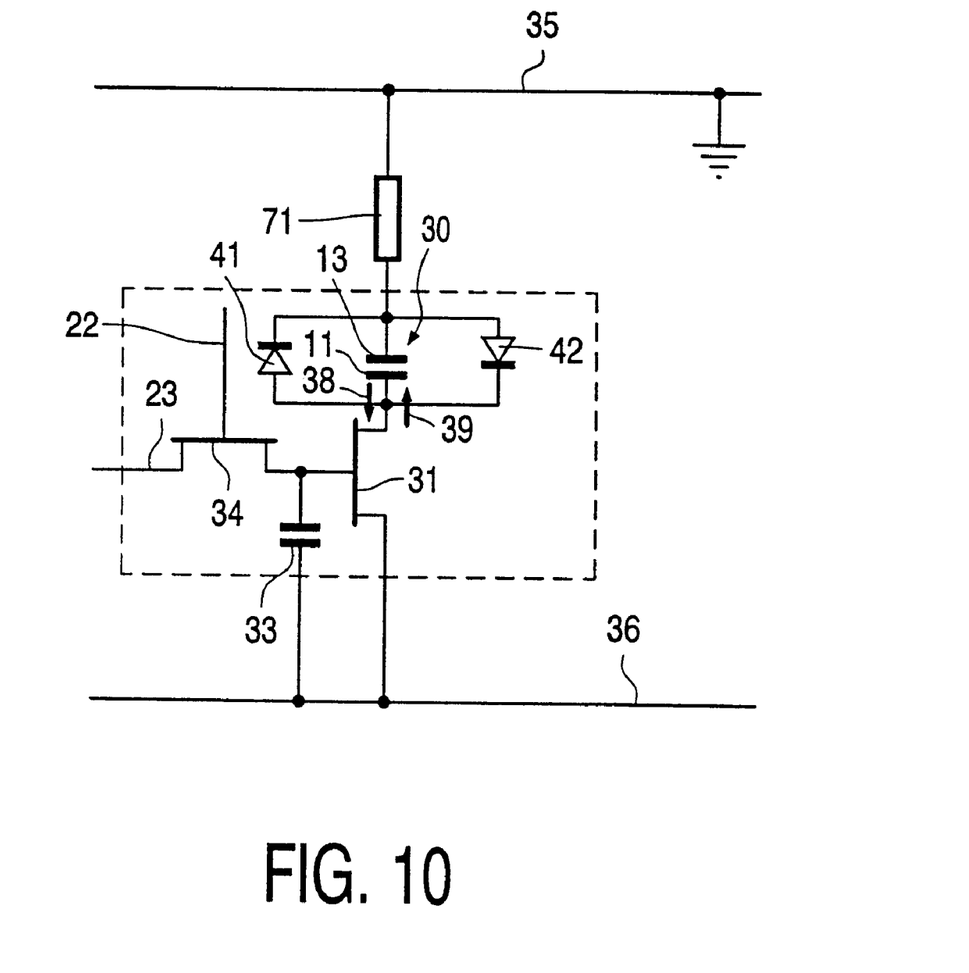

Further embodiments of the device in accordance with the invention are illustrated in FIGS. 6 to 8.

FIG. 6 shows a part of a display device 20 comprising a matrix of display circuit elements 21 at the areas of crossings of m row electrodes 22 (selection electrodes) and n column electrodes 23 (data electrodes). Row electrodes 22 are selected by means of a row driver 24, while column electrodes 23 are provided with data voltages via a column driver 25. Incoming data signals 26 are, if necessary, processed in a processor 27. Mutual synchronization takes place via control lines 28, see also the description of FIG. 2.

The device of this embodiment of the invention will now be described with reference to FIG. 7. It comprises a switching mirror device 30 as described with reference to FIGS. 1A, 1B, which for simplicity is represented by a capacitor. One transparent electroconductive electrode layer, 11 in this example, is connected to a fixed reference voltage (0V in this example) supplied by a voltage line 35. The other transparent electroconductive electrode layers 13 is connected via a switch, in this example an n-type field effect transistor (TFT) 31, to a negative power voltage line 36. The gate connection of TFT 31 is connected to one plate of a capacitor 33, which functions as a storage capacitor and is addressed by TFT 34 via m row electrodes 22 (selection electrodes) and n column electrodes 23 (data electrodes).

During selection of a row via electrodes 22, the data voltage, as supplied by data electrode 23 is transferred to the gates of the n-type TFT 31. The field effect transistor (dependent on the sign of the data voltage) starts conducting and acts as a current source and starts charging (arrow 38) the switching mirror element 30. During the hold time, the remainder of rows in the display is selected. The storage capacitor 33 (which may be formed by the inherent gate-drain capacitance of TFT 31) ensures that, during this hold time, the current sources continue to supply current needed for switching the switching mirror elements 30. This may be effected during one frame period (the time all lines are selected once), but may also last several frame times (depending on the size of the display, the dimensions of the mirrors and the TFTs). After completion of the charging, the current is switched off. To detect the end of charging or reset, preferably a current sensor 71 is present in the current path common to both the charge mode and the reset mode. The switching mirror element 30 will now remain in the state it reached.

Before charging the switching mirror elements 30, according to the invention, all or parts of the switching mirror elements are reset (discharged (arrow 39)). In this example, this is accomplished by means of an extra positive power voltage line 29. The voltage on said line 29 is applied to electrode layer 11 via a switch (TFT) 32, controlled by control line 40. By choosing a suitable low voltage, the switching mirror element never exceeds the maximum voltage which can be applied before degradation occurs, but the charging speed may be limited. Alternatively, by using a higher voltage for reset, the reset is carried out at the optimal speed (the current is not limited) while the addition of a protection diode 41 will again prevent excess voltage degrading during discharge.

Preferably, the reset voltage is chosen in such a way as to reset the display to a reflective or white (transmissive) mode. This is advantageous for many applications, such as document viewers and electronic books, where information is given as dark letters on a white background. In this case, the smallest percentage of the display needs reset (only the dark pixels) resulting in a low power driving method and extended display lifetime. The diode 41 arranged on the switching mirror element 30 is arranged to provide protection against excessive voltages across the element 30 during charging.

FIG. 8 shows another embodiment in which the voltage line 29 and TFT 32 of FIG. 7 are dispensed with, so that a larger aperture can be realized. Driving means (not shown) are able to switch power voltage line 36 between a negative voltage (drive voltage) and a positive voltage (reset voltage).

Reset of an image is obtained by first setting the power supply line 36 to the reset voltage, and addressing all TFTs 31 to on; the latter can be done a row at a time or by addressing all rows simultaneously. The TFTs 31 act as switches and all switching mirror elements are reset. Dependent on the specific characteristics of the TFTs and the switching mirror elements, the reset current gradually decreases and the previous image will be erased. The switching mirror elements then get a high impedance and the current stops flowing. If necessary, this reset mode can be interrupted if the current falls below a certain level by means of current sensor 71. To speed up reset, a higher voltage can be applied due to the protection of the pixel by diode 42.

Before the next charge mode, the picture elements defining an image are selected and, in the charge mode, the power supply line 36 is set to the drive voltage, so that the new image is displayed. Again, pixels being charged are protected from excess voltage by diode 42. All TFTs 31 are then addressed to off so as to reduce any gate voltage stress. The new image will remain until the cycle is repeated. Other reference numerals in FIG. 8 have the same significance as those in FIG. 7.

In summary, the invention can be described as follows.

A matrix display (20) comprises pixels based on switching elements (30) which comprise a switchable layer which can be switched from one chemical state to another, the optical properties of said chemical states being different. Voltage-limiting devices (41, 42) preventing pixel degradation are arranged on the switching elements (30).

The protective scope of the invention is not limited to the embodiments described. For example, it may be applied to electrochromic devices in which the optical switching layer brings about a change of concentration of hydrogen, lithium or oxygen ions or electrons. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The protective scope is neither limited to the use of a driving circuit using TFTs. The protective scope includes driving circuits using thin-film diodes or MIM (metal-insulator-metal) switches or mono-crystal Si switches, although, as explained above, the invention is particularly advantageous for devices using driving circuits with TFTs.

As an example of a switchable layer, reference is made to electrochromic layers such as those described in World Patent Application no WO 98/48323.

What is claim is:

1. A device (20) comprising an array of pixels based on switching elements (30) that are reversibly switchable between at least a first and a second chemical state, said first and second chemical states differing in optical properties, said pixels being switched by supplying a switching current to a stack of layers including a switchable layer (3) of an optically switchable material which brings about a switch from said first chemical state to said second chemical state, and a driving circuit (24, 25) for switching said pixels, wherein the device has, for at least some of said pixels, at least one voltage-limiting device (41, 42, 60, 62) arranged to ensure voltage across said stack of layers is optimal for preventing degradation.

2. The device of claim 1, wherein, for all of said pixels, at least one voltage limiting device is arranged parallel to said stack of layers.

3. The device of claim 1, wherein at least two voltage-limiting devices are arranged in parallel on said stack of layers to limit the voltage across said stack of layers during charging and discharging.

4. The device of claim 1, wherein said at least one voltage-limiting device is a diode (41, 42, 60, 61).

5. The device of claim 1, wherein one side of said at least one voltage-limiting device is connected to a reference voltage point (Vref1, Vref2) or line in the driving circuit.

6. The device of claim 1, wherein said driving circuit comprises thin-film transistors (TFT).

7. The device of claim 1, wherein said optically switchable material is a material in which switching is obtained by changing a concentration of hydrogen.

8. The device of claim 1, wherein said optically switchable material is a material in which switching is obtained by changing a concentration of Lithium.

9. The device of claim 1, wherein said optically switchable material is an electrochromic material.

10. A display device (20) comprising pixels based on switching elements (30) that are reversibly switchable between at least a first chemical state and, a second chemical state, said first and second chemical states differing in optical properties, said switching elements (30) being switched by supplying a switching current to a stack of layers including a switchable layer (3) of an optically switchable material which brings about a switch from said first chemical state to said second chemical state, and a driving circuit (24, 25) for switching said pixels, wherein the display device has, for at least some of said pixels, at least two voltage-limiting device (41, 42, 60, 61) arranged in parallel on said stack of layers.

* * * * *